(12) United States Patent
Patanella (10) Patent No.: US 11,064,036 B2
(45) Date of Patent: *Jul. 13, 2021

(54) SYSTEM FOR DISCOVERING SERVICES

(71) Applicant: Workday, Inc., Pleasanton, CA (US)

(72) Inventor: Guido Patanella, Barcelona (ES)

(73) Assignee: Workday, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,998

(22) Filed: Apr. 16, 2020

(65) Prior Publication Data

US 2020/0244746 A1    Jul. 30, 2020

Related U.S. Application Data

(63) Continuation of application No. 16/139,537, filed on Sep. 24, 2018, now Pat. No. 10,666,746.

(51) Int. Cl.
| | |
|---|---|
| *H04L 29/08* | (2006.01) |
| *H04L 12/24* | (2006.01) |
| *G06F 16/14* | (2019.01) |
| *G06F 16/901* | (2019.01) |

(52) U.S. Cl.
CPC ............ *H04L 67/16* (2013.01); *G06F 16/148* (2019.01); *G06F 16/9024* (2019.01); *H04L 41/22* (2013.01); *H04L 67/1061* (2013.01)

(58) Field of Classification Search
CPC ..... H04L 67/16; H04L 41/22; H04L 67/1061; H04L 41/08; H04L 29/08396; H04L 29/08648; H04L 43/0817; H04L 29/12113; H04L 45/02; H04L 61/1541; H04L 41/12; H04L 41/5048; H04L 41/5058; H04L 41/20; G06F 16/9024; G06F 16/148

See application file for complete search history.

(56) References Cited

U.S. PATENT DOCUMENTS

| | | | |
|---|---|---|---|
| 6,611,502 B1 | 8/2003 | Seaman | |
| 6,628,624 B1 | 9/2003 | Mahajan | |
| 8,307,444 B1 | 11/2012 | Mayer | |
| 8,934,495 B1 | 1/2015 | Hilton | |
| 10,439,876 B2 | 10/2019 | Kaluza | |
| 2006/0168152 A1 | 7/2006 | Soluk | |
| 2008/0031238 A1 | 2/2008 | Harmelin | |
| 2010/0110880 A1 | 5/2010 | Kulkarni | |
| 2011/0208841 A1 | 8/2011 | Robertson | |
| 2013/0077622 A1 | 3/2013 | Tatsumi | |
| 2015/0047032 A1* | 2/2015 | Hannis | H04L 63/1416 726/23 |

(Continued)

*Primary Examiner* — Michael Won
(74) *Attorney, Agent, or Firm* — Van Pelt, Yi & James LLP (57) ABSTRACT

A system for discovering services includes a storage device and a processor. The storage device is configured to store a catalog of software installed packages. A processor is configured to scan a file system to identify configuration files associated with one or more packages found in the catalog of software installed packages; identify a subset of configuration files associated with executing processes by finding references to a configuration file in active processor memory and placing the configuration file in the subset of configuration files; and verify that a network port associated with an executing process corresponds to a designated network port as indicated in the configuration file associated with the executing process.

20 Claims, 9 Drawing Sheets

(56) References Cited

U.S. PATENT DOCUMENTS

| | | | |
|---|---|---|---|
| 2016/0328222 A1* | 11/2016 | Arumugam | G06F 8/71 |
| 2017/0185603 A1 | 6/2017 | Dentel | |
| 2017/0373932 A1 | 12/2017 | Subramanian | |
| 2018/0131579 A1* | 5/2018 | Jacobs | H04L 41/082 |
| 2018/0324054 A1* | 11/2018 | Biran | H04L 41/22 |
| 2019/0296972 A1* | 9/2019 | Brotherson | H04L 12/4641 |
| 2019/0342162 A1* | 11/2019 | Bendre | H04L 67/32 |

* cited by examiner

SYSTEM FOR DISCOVERING SERVICES

This application is a continuation of co-pending U.S. patent application Ser. No. 16/139,537, entitled SYSTEM FOR DISCOVERING SERVICES filed Sep. 24, 2018 which is incorporated herein by reference for all purposes.

BACKGROUND OF THE INVENTION

A cluster system comprises a plurality of computers each executing a plurality of processes. Each process of the plurality of processes comprises a service—for example, a service comprising a web server, a service comprising data processing application, a service comprise a connection server daemon, etc. A cluster system administrator is required to be aware of the services executing on each computer of the cluster system and be able to correct problems in the event a computer is in an incorrect state. In order for the cluster system administrator to determine the state of the cluster, information is required to be collected and provided to the system administrator. Some services include processes for announcing various internal details relevant to other processes, enabling straightforward information collection. However, some services are not configured to announce such details, creating a problem where it is difficult to determine what the service is and how to evaluate whether the service is proper operating state.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for discovering services is disclosed. The system comprises a storage device and a processor. The storage device is configured to store a catalog of software installed packages. The processor is configured to scan a file system to identify configuration files associated with one or more packages found in the catalog of software installed packages, identify a subset of configuration files associated with executing processes by finding references to a configuration file in active processor memory and placing the configuration file in the subset of configuration files, and verify that a network port associated with an executing process corresponds to a designated network port as indicated in the configuration file associated with the executing process. The system for discovering services additionally comprises a memory coupled to the processor and configured to provide the processor with instructions.

A system for discovering services comprises a computer system of a cluster. The system for discovering services comprises a system for determining a set of services executing on the computer system and reporting the set of services. Each computer system of the cluster reports a set of services to a master discovery node of the cluster system. The master discovery node of the cluster system reports aggregated service information to a user using a user system—for instance, a system administrator for administrating the cluster system. The system for discovering services determines the set of services executing on the computer system by first identifying a catalog of software installed packages stored on the computer system. The catalog of software installed packages is read to identify the set of packages stored in the catalog. Only services associated with software installed packages stored in the catalog can be executing on the computer system. Configuration files associated with the packages are determined (e.g., by scanning the packages, by accessing a table of configuration files associated with packages, etc.). The file system of the computer system is then scanned to identify configuration files associated with one or more of the packages in the catalog of software installed packages. A configuration file is stored on the computer system's filesystem for each potential instance of the associated service executing on the computer system. Each stored configuration file includes information associated with an instance of the service. Identifying the stored configuration files indicates the maximum number of instances of each service that can be executing on the computer system as well as information that can be used to identify the services. Active processor memory is then scanned to find references to the stored configuration files. A subset of configuration files with references in active processor memory is identified. The association of the executing process including the reference to a configuration file to that configuration file is then verified by monitoring the network activity of the process. The configuration file includes network information for a process instance (e.g., a port the process is listening on) that can be verified by monitoring the process. Once the network activity is verified, the service associated with the process is known. Each process executing on the computer is associated with a configuration file and can be identified in this way.

Service discovery solutions for computer systems include self-registration and third party registration. Self-registration is the typical approach that is common to most microservices architectures and requires that service software be tailored to register itself appropriately within the microservice architecture of any given computer system. The system for discovering services allows any application based on any service to be discovered without software modifications. In addition, the system for discovering services incorporates monitoring features which ensures that the services are unregistered in the event of service crashes. For third party registration, service instances aren't responsible for registering themselves with the service registry. Instead, another system component, typically known as the service registrar, handles the registration. The service registrar tracks changes to the set of running instances by either polling the deployment environment or subscribing to events. When it notices a newly available service instance it registers the instance with the service registry. The service registrar also deregisters terminated service instances. One drawback of third party registration is that it needs to be built into the deployment environment as a highly available system component. However, third party registrars may still erroneously count processes if they are not active or not operating appropriately. The system for discovering services combines the discovery of the service related process and validates all of its networking activity from an operating system low level, for either inbound and outbound connections. The validation is with regards to inbound connections, which are towards NETWORK PORTS owned by a service instance, as well as outbound connections, which are towards NETWORK PORTS of Other service instances. This validation ensures that a service has operational portals that are in a listening state and being actually used, as well as that the service can connect to other services. In addition, the system for discovering services can monitor CPU and MEM utilization metrics to determine whether the service is operating within normal patterns of utilization as well as being able to perform health checks.

The system for discovering services improves the computer system by collecting and aggregating service data across nodes of a computing cluster. The aggregated data is necessary for a system administrator to fully know the system status and take appropriate actions to keep it running successfully (e.g., actively determining, based on the system status, processes to be stopped, processes to be suspended, processes to be continued, new processes to be started, processes to be duplicated, etc.). The system for discovering services is able to identify services without requiring special modification to the service—for instance without requiring the service to announce its name and networking details such as the network communication ports and connections. The system for discovering services additionally satisfies a requirement to operate with minimal system overhead.

Figure 1:
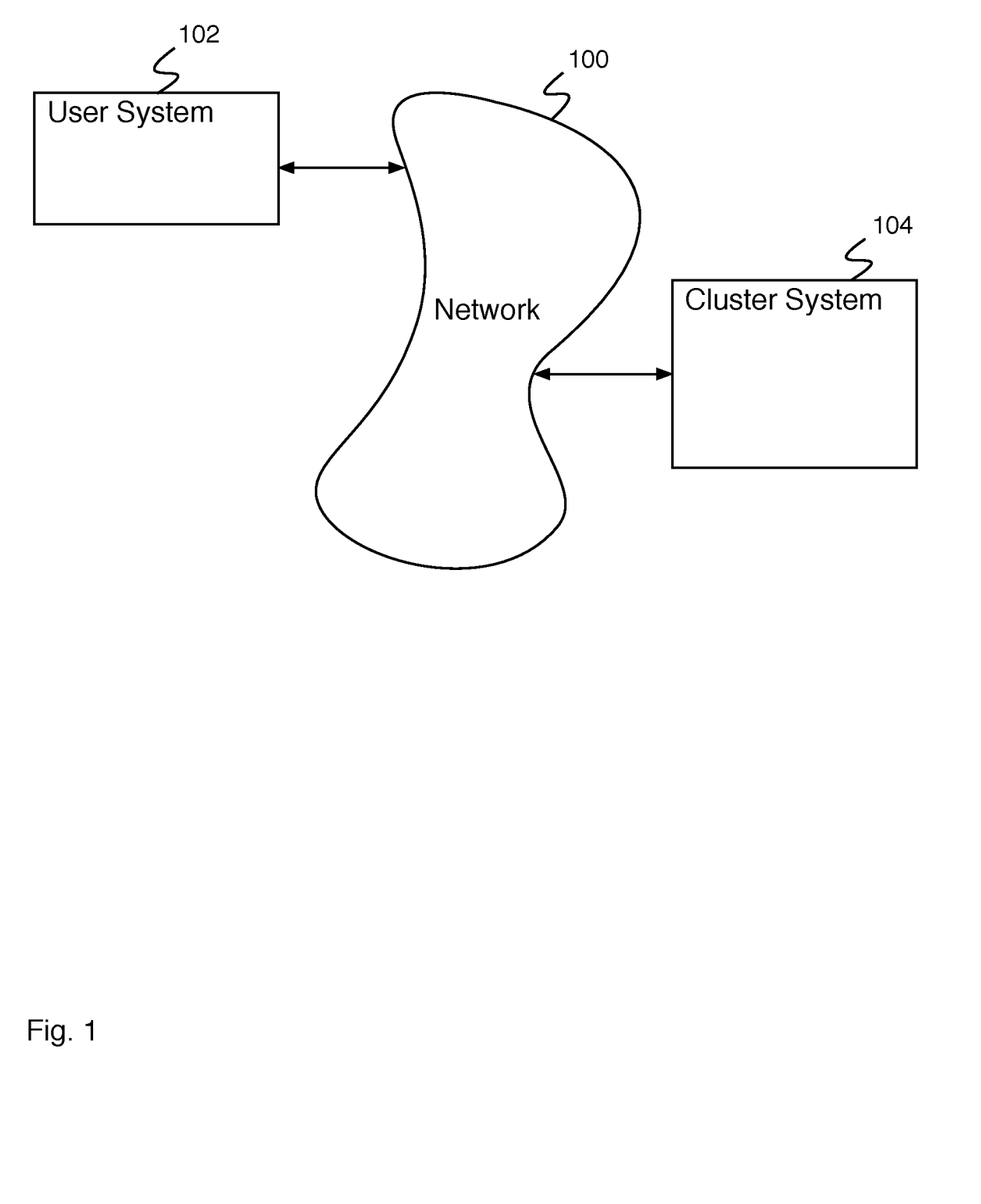
FIG. 1 is a block diagram illustrating an embodiment of a network system.

FIG. 1 is a block diagram illustrating an embodiment of a network system. In some embodiments, the network system of FIG. 1 comprises a network system for a system for discovering services. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102 and cluster system 104 communicate via network 100. User system 102 comprises a system for use by a user—for example, a database system user, a cluster system user, a system administrator, etc. User system 102 comprises a system for storing data, accessing data, modifying data, executing business processes, creating a report, creating a document, executing administrator commands, configuring computer systems, etc.

Cluster system 104 comprises a database system for providing user access to data stored in cluster system 104 (e.g., access to add data, view data, modify data, delete data, access reports, execute business processes, etc.). User system 102 comprises user systems for use by users. User system 102 stores and/or accesses data on cluster system 104. A user uses a user system to interact with cluster system 104—for example, to store database data, to request database data, to create a report based on database data, to process data stored in a database, to create a document, to link an element in a document to database data, to access a document, to utilize a system for element tracking in documents, etc.

An administrator using user system 102 administrates services on cluster system 104. The administrator accesses cluster system 104 to start services, stop services, change service configurations, determine services that are executing, determine processor usage, determine memory usage, etc. An administrator using user system 102 requests information describing services executing on cluster system 104. Information describing services executing on cluster system 104 is compiled by a system for discovering services executing on a master node of cluster system 104 and on other nodes of cluster system 104. The system for discovering services comprises a storage device configured to store a catalog of packages indicating all services installed. The system for discovering services comprises a processor configured to scan a filesystem to identify configuration files associated with one or more packages found in the catalog of installed software packages. Each executing instance of a service is associated with a configuration file. The system for discovering services identifies a subset of the configuration files associated with processes that are currently executing by finding references to a configuration file in active processor memory and placing the configuration file in the subset of configuration files. Processes are then associated with services using the found configuration file references. The association is verified by determining a network port associated with an executing process (e.g., a network port the process is listening on) and verifying the network port corresponds to a designated network port as indicated in the configuration file.

Figure 2:
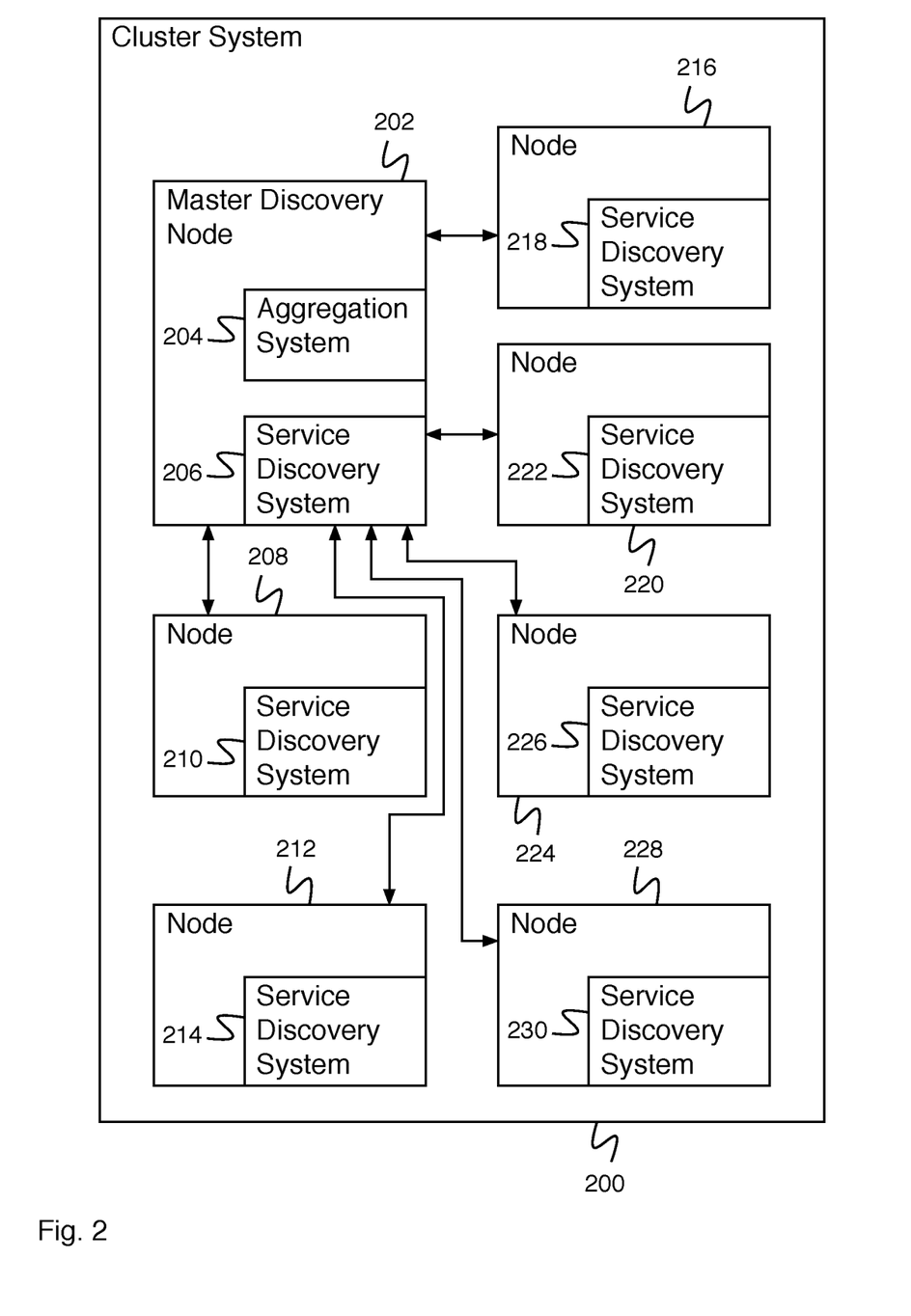
FIG. 2 is a block diagram illustrating an embodiment of a cluster system.

FIG. 2 is a block diagram illustrating an embodiment of a cluster system. In some embodiments, cluster system 200 of FIG. 2 comprises cluster system 104 of FIG. 1. In the example shown, cluster system 200 comprises master discovery node 202 and a plurality of nodes (e.g., node 208, node 212, node 216, node 220, node 224, and node 228). Master discovery node 202 comprises aggregation system 204 for aggregating service data from a plurality of systems for discovering services. Master discovery node 202 additionally comprises service discovery system 206 for determining a set of services executing on master discovery node 202. Each node of the plurality of nodes comprises a system for discovering services on that node (e.g., node 208 comprises service discovery system 210, node 212 comprises service discovery system 214, node 216 comprises service discovery system 218, node 220 comprises service discovery system 222, node 224 comprises service discovery system 226, and node 228 comprises service discovery system 230). Each service discovery system of cluster system 200 provides service information to aggregation system 204. Aggregation system 204 aggregates the service data and provides aggregated service data (e.g., to a user using a user system).

Each service discovery system discovers services executing on its cluster node. The service discovery system comprises a storage device configured to store a catalog of software installed packages indicating all services installed. The service discovery system comprises a processor configured to scan a filesystem to identify configuration files associated with one or more packages found in the catalog of software installed packages. Each executing instance of a service is associated with a configuration file. The system for discovering services identifies a subset of the configuration files associated with processes that are currently executing by finding references to a configuration file in active processor memory and placing the configuration file in the subset of configuration files. Processes are then associated with services using the found configuration file references. The association is verified by determining a network port associated with an executing process (e.g., a network port the process is listening on) and verifying the network port corresponds to a designated network port as indicated in the configuration file. If an executing process fails to be verified, its discovered details are stored in memory and its status is marked as "service candidate incomplete", allowing the system administrator to review the corresponding template. In some situations, this indicates that a service template is too restrictive and requires further refinements. A list of executing services is then provided based at least in part on the subset of configuration files that have been identified. For example, the list of executing services is provided to master discovery node 202 or to a user using a user system. Master discovery node 202 aggregates information received from one or more service discovery systems using aggregation system 204 and determines display information comprising aggregated service information. Master discovery node 202 provides the display information to a user using a user system.

Figure 3:
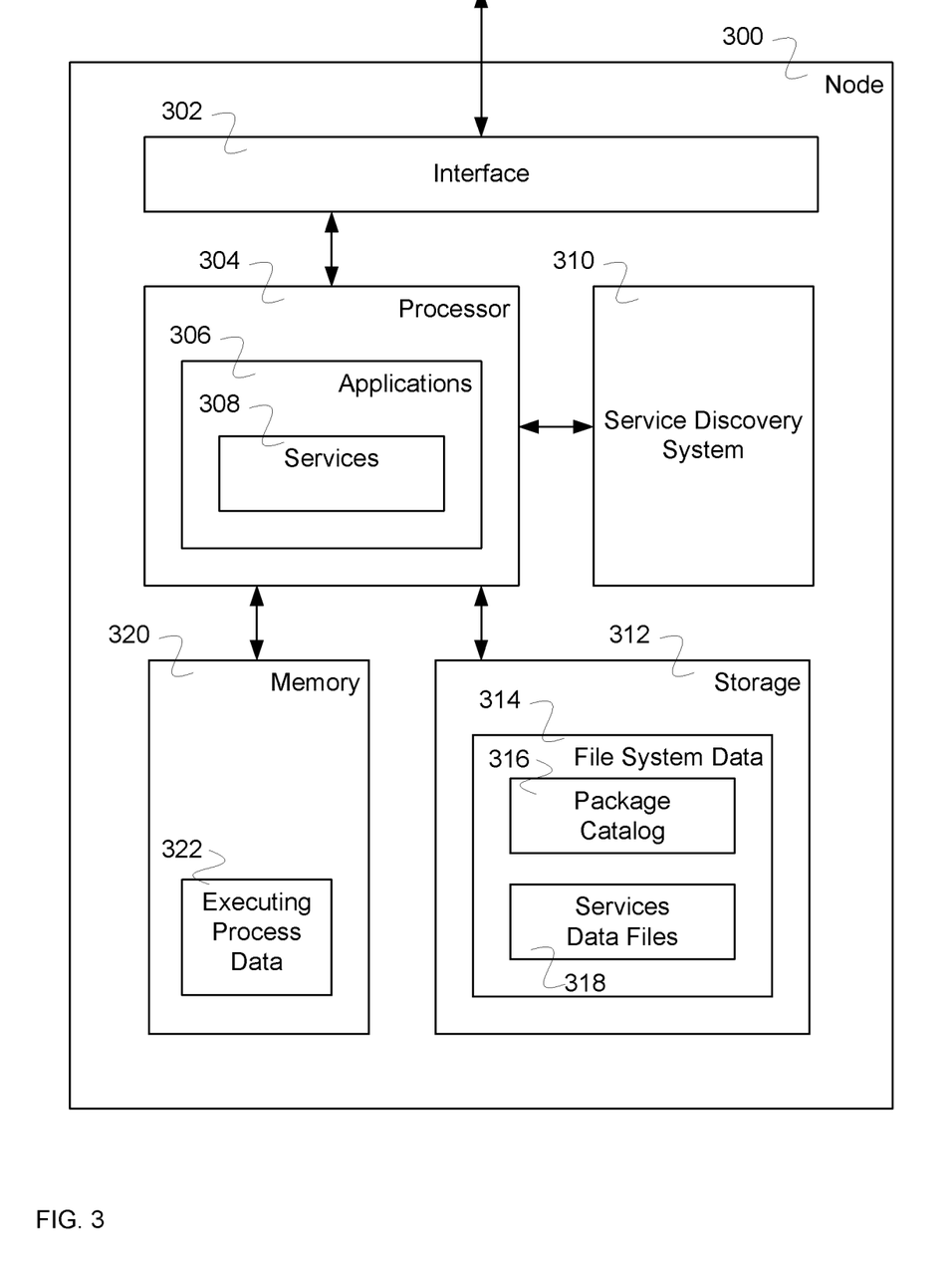
In FIG. 3 is a block diagram illustrating an embodiment of a node.

FIG. 3 is a block diagram illustrating an embodiment of a node. In some embodiments, node 300 comprises a node of FIG. 2 (e.g., master discovery node 202 (with aggregation system also), node 208, node 212, node 216, node 220, node 224, or node 228). In the example shown, node 300 comprises interface 302 for communicating with external systems. Interface 302 is in communication with processor 304. Processor 304 comprises a processor for executing applications. Processor 304 comprises applications 306 including services 308. Node 300 includes service discovery system 310. Service discovery system 310 comprises system of node 300 for discovering other services (e.g., services 308). For example, discovering services comprises determining a service name or other attribute data associated with a process or service executing on processor 304. Service discovery system 310 determines display information associated with service information—for example, baseline process information (e.g., a typical set of processes executed by processor 304), anomaly information (e.g., anomalies in the present set of executing processes), process name information, number of instances information, process time information, process memory usage information, process central processor unit (CPU) usage information, unavailable network connection information, missing stack services information, port information, high CPU usage information, or high memory usage information. Processor 304 is in communication with storage 312 and memory 320. Storage 312 comprises data storage, including file system data 314. File system data 314 comprises package catalog 316. Package catalog 316 comprises services data files 318 that store data for service packages. Service packages comprise data for execution of services—for example, code, compiled code, software libraries, configuration information, instructions for executing a service, etc. For a service to be running (e.g., as part of services 308), a package for the service will exist as part of package catalog 316. File system data 314 additionally comprises service data files 318, e.g., comprising data files associated with services. For example, service data files 318 comprises configuration data files and other data files. Memory 320 comprises active processor memory (e.g., for storing active process data for processor 304). Memory 320 stores executing process data 322.

Service discovery system 310 discovers service names and/or other service data for services 308. Node 300 comprises storage 312, storing package catalog 316 indicating all services installed. Service discovery system 300 comprises processor 304 configured (e.g., via inclusion of service discovery system 310) to scan file system data 314 to identify configuration files (e.g., stored in service data files 318) associated with one or more packages found in package catalog 316. Each executing instance of a service is associated with a configuration file. The system for discovering services identifies a subset of the configuration files associated with processes that are currently executing by finding references to a configuration file in memory 320 and placing the configuration file in the subset of configuration files. Processes are then associated with services using the found configuration file references. The association is verified by determining a network port (e.g., of interface 302) associated with an executing process (e.g., a network port the process is listening on) and verifying the network port corresponds to a designated network port as indicated in the configuration file. A list of executing services is then provided based at least in part on the subset of configuration files that have been identified. For example, the list of executing services is provided to a master discovery node for aggregation or to a user using a user system. Display information (e.g., additional information for display purposes) is provided to the master discovery node or to the user using the user system. For example, display information comprises a graph, baseline process information, anomaly information, process user information, process parent information, process child information, process name information, number of instances information, process time information, process memory usage information, process CPU usage information, unavailable network connection information, missing stack services information, port information, high CPU usage information, or high memory usage information.

Figure 4:
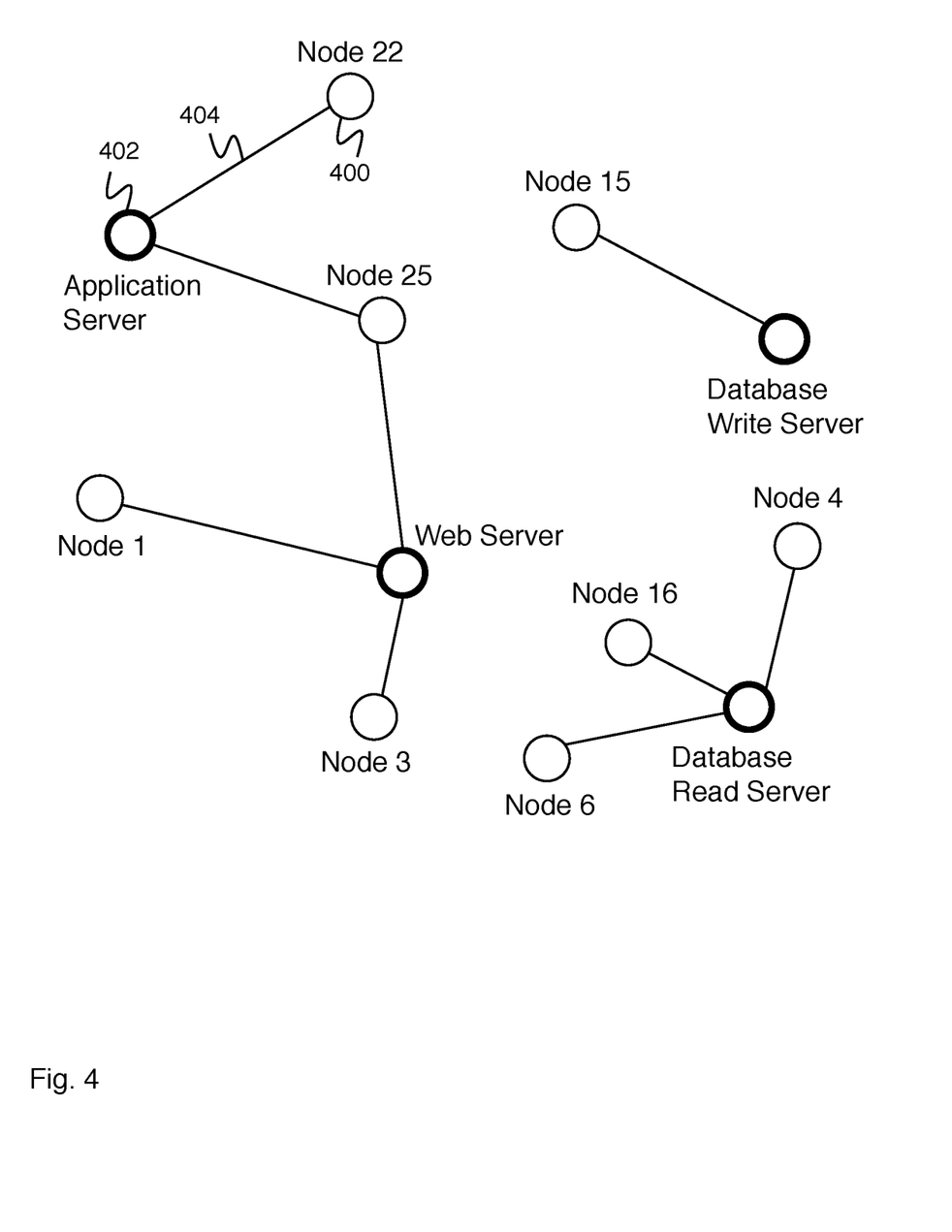
FIG. 4 is a diagram illustrating an embodiment of a user interface for a cluster display.

FIG. 4 is a diagram illustrating an embodiment of a user interface for a cluster display. In some embodiments, display information for the cluster display of FIG. 4 is determined by aggregation system 204 of FIG. 2, or by user system 102 of FIG. 1 in response to aggregated information from an aggregation system. In the example shown, the cluster display displays nodes and server roles. The cluster display displays a plurality of thin circles indicating nodes (e.g., thin circle 400 indicating node 22). Each thin circle corresponds to a node of a cluster system. Thin circles indicating nodes are connected with lines (e.g., line 404) to thick circles indicating server roles (e.g., thick circle 402 indicating the application server role), indicating the server is taking on the indicated role. For example, once a set of services executing on a node is discovered, the set of services can be analyzed to determine one or more server roles. Multiple nodes can have the same role (e.g., node 4, node 6, and node 16 are all database read servers; node 22 and node 25 are application servers; and node 25, node 1, and node 3 are web servers) the can be a 1:1 correspondence from server to role (e.g., node 15 has one role and is the only database write server), and nodes can have multiple roles (e.g., node 25 is both an application server and a web server). A user interface display in this way provides a compact and easy to understand overview of the roles present in a computing cluster. The user interface of FIG. 4 additionally allows a user to change the user interface view to that of the services executing on a node—for example, by making an indication to that node.

In various embodiments, the display of the system are displayed using colors or textures and are displayed statically or dynamically (e.g., when triggered by an indication such as hovering over a display item, clicking on (e.g., right or left clicking), or any other appropriate indication).

Figure 5:
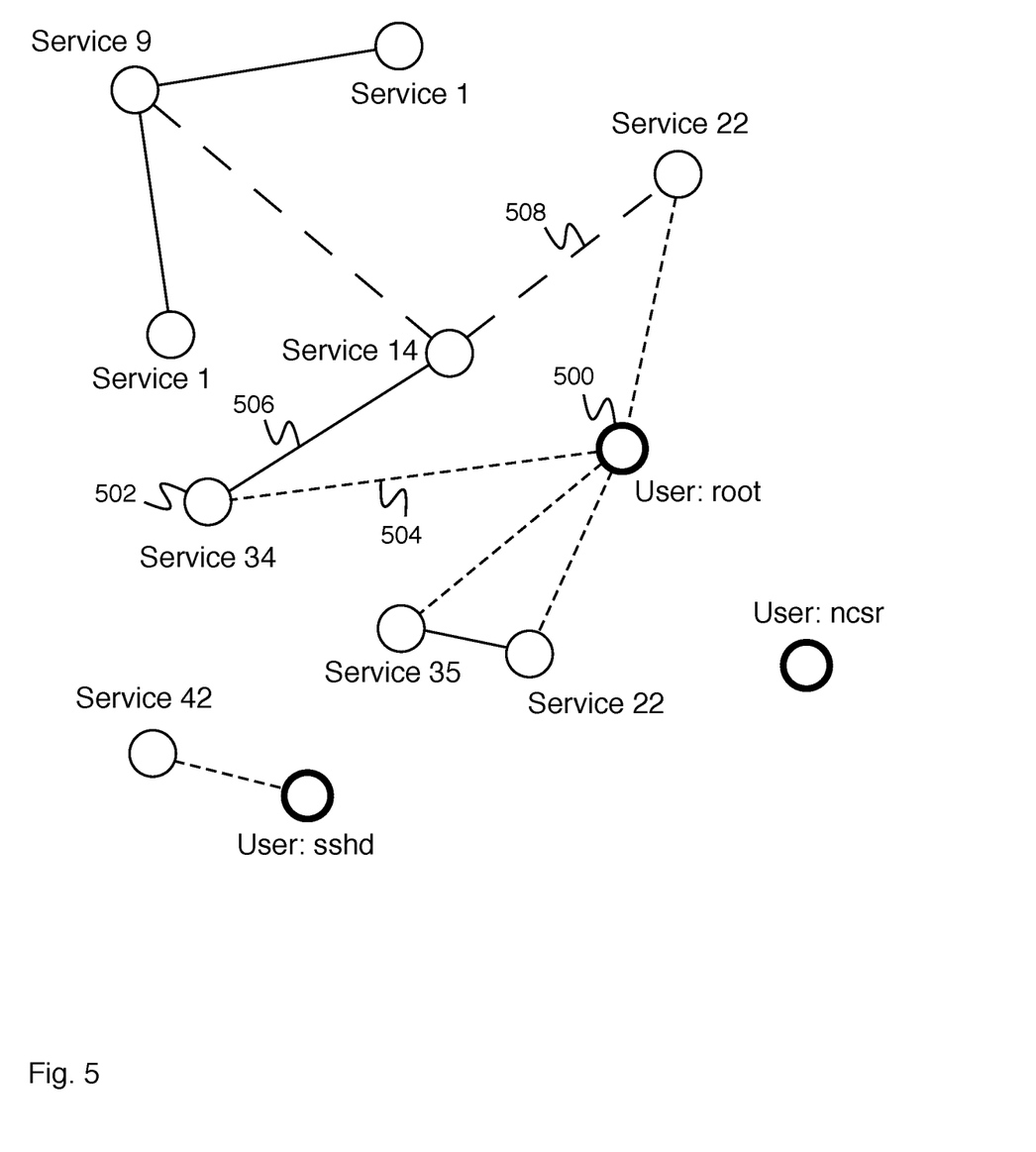
FIG. 5 is a diagram illustrating an embodiment of a user interface for a cluster display.

FIG. 5 is a diagram illustrating an embodiment of a user interface for a cluster display. In some embodiments, display information for the cluster display of FIG. 5 is determined by aggregation system 204 of FIG. 2, or by user system 102 of FIG. 1 in response to aggregated information from an aggregation system. In some embodiments, the display of FIG. 5 is provided in response to an indication to a node in a cluster display displaying nodes and server roles. In the example shown, the cluster display displays services and users. The cluster display displays a plurality of thin circles indicating services (e.g., thin circle 502 indicating service 34). Each thin circle corresponds to a service executing on a node. The cluster display additionally displays a plurality of thick circles indicating users (e.g., thick circle 500 indicating user root). Thin circles indicating services are connected to thick circles indicating users with short dashed lines (e.g., short dashed line 504 indicating that service 34 is executing for user:root of thick circle 500), indicating the user owns the process. A user can own no services (e.g., user:ncsr), one service (e.g., user: sshd owning service 42), or multiple services (e.g., user:root owning two copies of service 22, service 35, and service 34). Thin circles indicating services are connected to one another with solid lines (e.g., solid line 506 connecting service 34 and service 14; connecting service 9 with 2 copies of service 1; and connecting service 35 and service 22), indicating the services are in communication with one another. Thin circles indicating services are additionally connected to one another with long dashed lines (e.g., long dashed line 508 connecting service 14 and service 22; and connecting service 14 and service 9), indicating a parent-child relationship between the services. In various embodiments, services associated with a node comprise one of the following: [Please list some example services].

Figure 6:
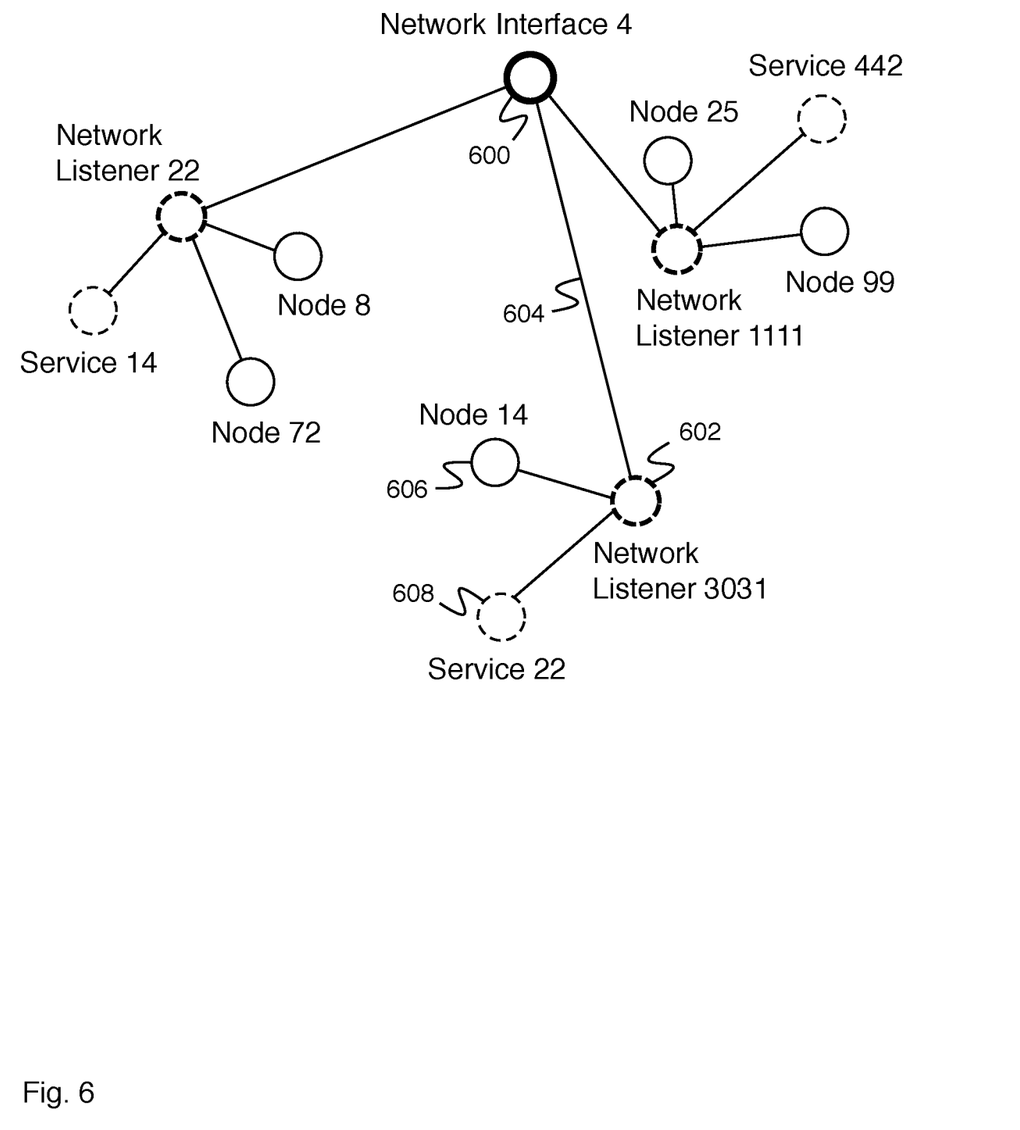
FIG. 6 is a diagram illustrating an embodiment of a user interface for a cluster display.

FIG. 6 is a diagram illustrating an embodiment of a user interface for a cluster display. In some embodiments, display information for the cluster display of FIG. 6 is determined by aggregation system 204 of FIG. 2, or by user system 102 of FIG. 1 in response to aggregated information from an aggregation system. In the example shown, the display of FIG. 6 provides networking information. The cluster display displays solid thick circle 600 indicating network interface 4. In some embodiments, the cluster display displays a plurality of solid thick circles indicating network interfaces. The cluster display displays a plurality of dashed thick circles indicating network listeners (e.g., dashed thick circle 602 indicating network listener 3031; network listener 22; and network listener 1111). A network listener comprises a process that listens for connection requests on a network interface. A line (e.g., line 604 between network listener 1111 and network interface 4; line between network listener 22 and network interface 4; and line between network listener 3031 and network interface 4) indicates the network interface a network listener listens for connections on. For example, the network listener comprises a process executing on the network interface it is listening for connections on. The cluster display displays a plurality of solid thin circles indicating nodes (e.g., solid thin circle 606 indicates node 14). A line connects a node with a network listener it is using for network communications (e.g., node 14 connected to network listener 3031; node 72 and node 8 connected to network listener 22; and node 25 and node 99 connected to network listener 1111). For example, a node can access one or more network listeners, and one or more nodes can access a network listener. The cluster display displays a plurality of dashed thin circles indicating services (e.g., dashed thin circle 608 indicates service 22). A line connects a service with a network listener it is using for network communications (e.g., service 22 is connected with network listener 3031; service 14 is connected with network listener 22; and service 442 is connected with network listener 1111). For example, a service can access one or more network listeners, and one or more services can access a network listener.

Figure 7:
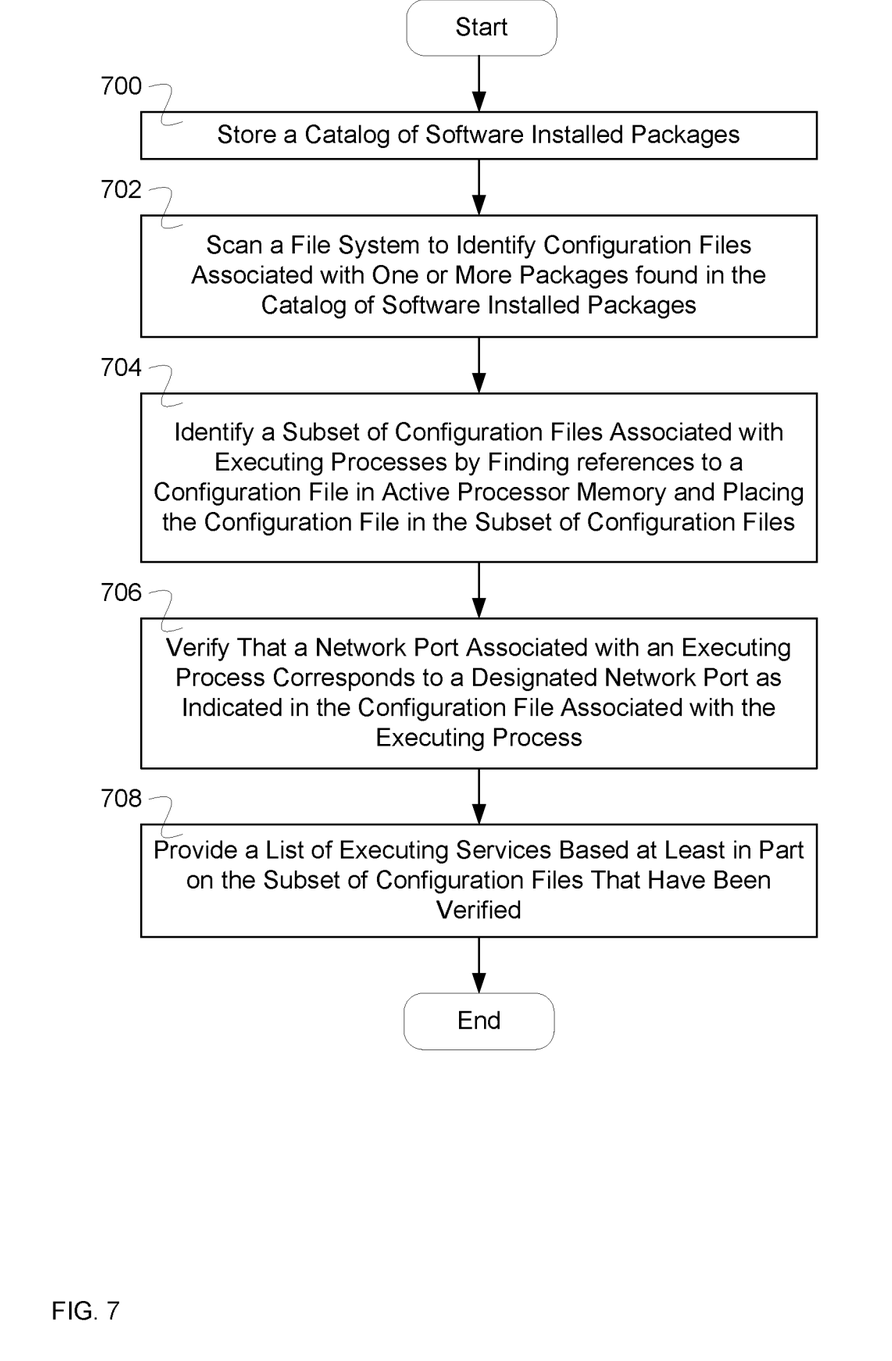
FIG. 7 is a flow diagram illustrating an embodiment of a process for discovering services.

FIG. 7 is a flow diagram illustrating an embodiment of a process for discovering services. In some embodiments, the process of FIG. 7 is executed by service discovery system 310 of FIG. 3. In the example shown, in 700, a catalog of software installed packages is stored. For example, the catalog of software installed packages is scanned to determine an index of the catalog of software installed packages comprising a list of packages stored in the catalog of software installed packages. Once the index is determined it does not need to be redetermined until the catalog changes. For example, an index of the catalog of software installed packages is determined in response to an indication that the catalog of packages has changed. A configuration file associated with each package of the catalog of packages is additionally determined. For example, the Apache package is associated with an httpd.conf configuration file or an apache2.conf configuration file.

In 702, a file system is scanned to identify configuration files associated with one or more packages found in the catalog of software installed packages. For example, one or more configuration files comprising one or more stored versions of the determined configuration files associated with packages of the catalog of software installed packages are identified. In 704, a subset of configuration files associated with executing processes are identified by finding references to a configuration file in active processor memory and placing the configuration file in the subset of configuration files. For example, executing instances of a service (e.g., as found in active processor memory) are associated with a configuration file of the one or more configuration files and placed in a list of the configuration files (e.g., a subset). In 706, the process verifies that a network port associated with an executing process corresponds to a designated network port as indicated in the configuration file associated with the executing process. For example, an executing process is checked to identify an associated network port and that this port is appropriately associated as indicated in the corresponding configuration file (e.g., for inbound and outbound traffic). As another example, the process verifies one or more of the following: whether the service process exists, whether the central processing unit (CPU) and memory usage levels (MEM Levels) are stable for the service, whether the service required listening ports are in listening status (e.g., inbound ports are actively being listened to as indicated as being inappropriate in a configuration file), whether other services are able to access listening ports to be able to communicate with the service, whether the service outbound connections exist (e.g., outbound ports are actively accessible as indicated as being appropriate in a configuration file), whether health check plugins exist and/or are in a positive state, etc. In 708, a list of executing services is provided based at least in part on the subset of configuration files that have been verified. In some embodiments, a server role is determined based at least in part on the subset of configuration files that have been verified.

Figure 8:
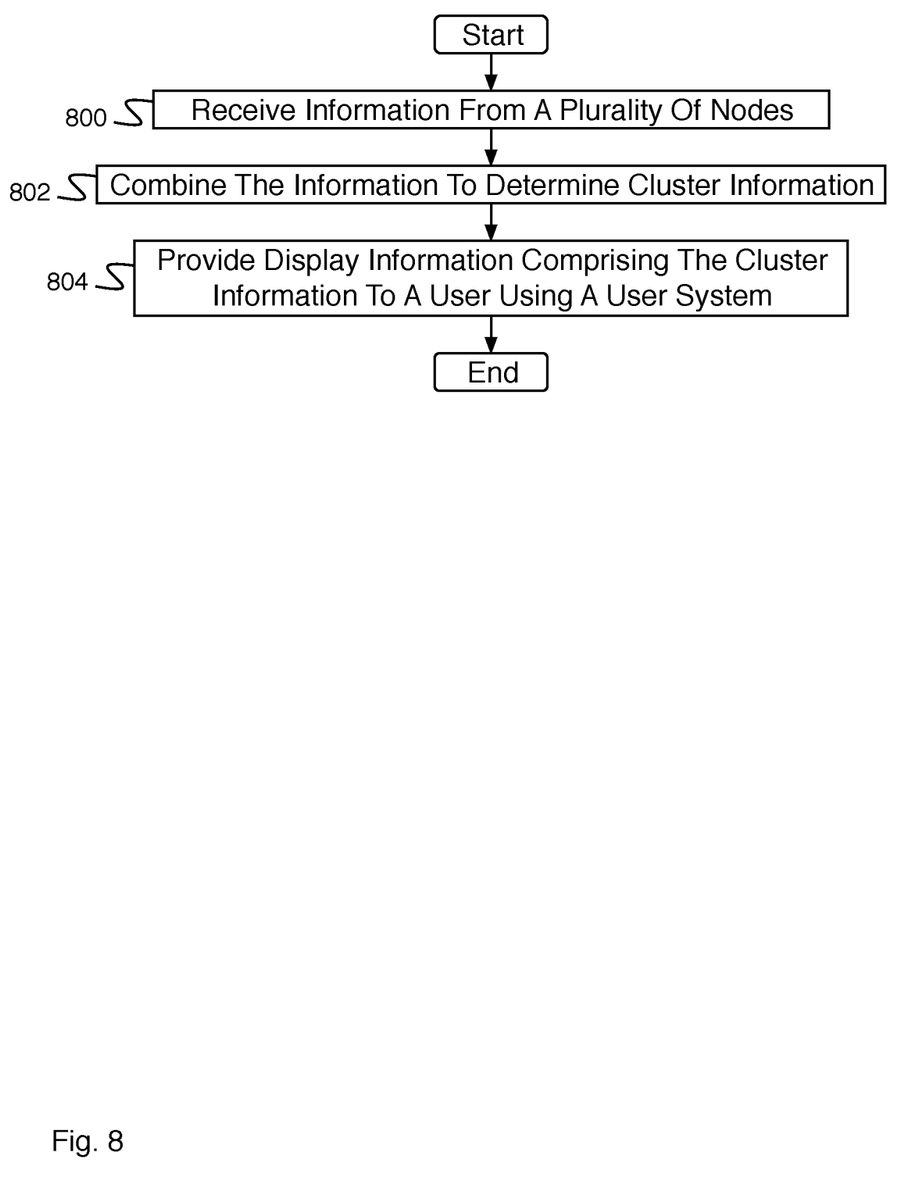
FIG. 8 is a flow diagram illustrating an embodiment of a process for an aggregation system.

FIG. 8 is a flow diagram illustrating an embodiment of a process for an aggregation system. In some embodiments, the process of FIG. 8 is executed by aggregation system 204 of FIG. 2. In the example shown, in 800, information is received from a plurality of nodes. In 802, the information is combined to determine cluster information. In 804, display information comprising the cluster information is provided to a user using a user system.

Figure 9:
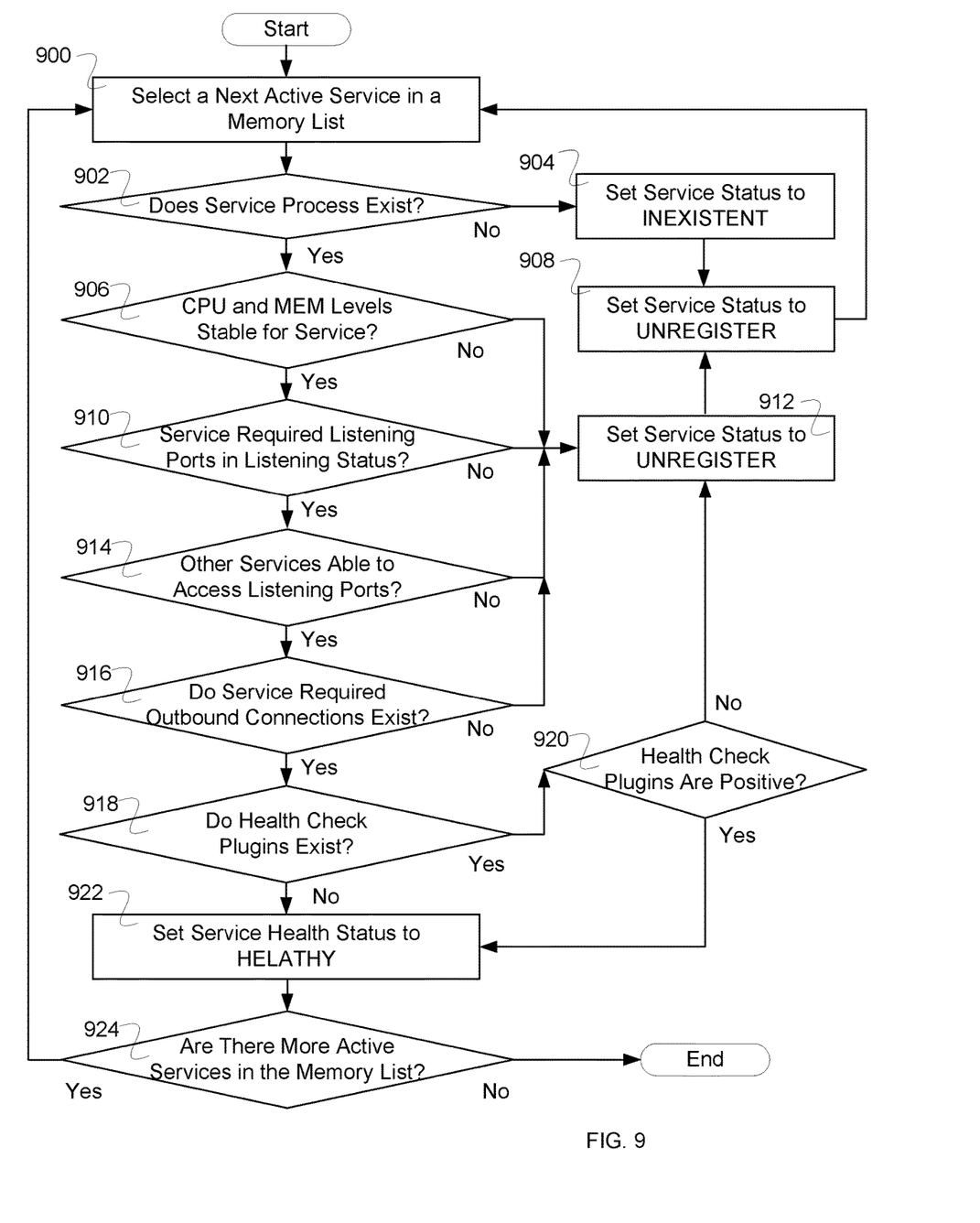
FIG. 9 is a flow diagram illustrating an embodiment of a process for verifying network ports for a service.

FIG. 9 is a flow diagram illustrating an embodiment of a process for verifying network ports for a service. In some embodiments, the process of FIG. 9 is used to implement 706 of FIG. 7. In the example shown, in 900 a next active service in a memory list is selected. In 902, it is determined whether a service process exists. In the event that the service process does not exist, in 904 the service status is set to "INEXISTENT" and control passes to 908. In 908, the service status is set of "UNREGISTER" and control passes to 900. In the event that the service process exists, in 906 it is determined whether the CPU and MEM Levels are stable for the service. In the event that the CPU and MEM Levels are not stable for the service, control passes to 912. In 912, the service status is set to "UNREGISTER" and control passes to 908. In the event that the CPU and MEM Levels are stable for the service, in 910 it is determined whether service required listening ports are in listening status. In the event that service required listening ports are not in listening status, control passes to 912. In the event that service required listening ports are in listening status, in 914 it is determined whether other services are able to access listening ports. In the event that the other services are not able to access listening ports, then control passes to 912. In the event that the other services are able to access listening ports, in 916 it is determined whether service required outbound connections exists. In the event that service required outbound connections do not exist, control passes to 912. In the event that service required outbound connection exist, in 918 it is determined whether health check plugins exist. In the event that health check plugins exist, control passes to 920. In 920, it is determined whether the health check plugins are positive. In the event that the health check plugins are not positive, control passes to 912. In the event that the health check plugins are positive, control passes to 922. In the event that health check plugins in 918 do not exist, control passes to 922. In 922, service health status is set to "HEALTHY" and control passes to 924. In 924, it is determined whether there are more active services in the memory list. In the event that there are not more active services in the memory list, the process ends. In the event that there are more active services in the memory list, control passes to 900.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for discovering services, comprising:
one or more processors; and
machine-readable media storing instructions which, when executed by the one or more processors, cause the one or more processors to perform operations comprising:
scanning a file system to identify configuration files associated with one or more packages found in a catalog of software installed packages;
identifying references to a configuration file in active processor memory;
placing the configuration file in a subset of configuration files associated with executing processes; and
verifying that a network port associated with an executing process corresponds to a designated network port as indicated in the configuration file associated with the executing process;
in response to determining that the configuration file indicates that the designated network port is for outbound traffic, verifying that the designated network port connection exists; and
providing an indication of outbound traffic verification to a master discovery node of a cluster system network connection.

2. The system of claim 1, wherein a package found in the catalog of software installed packages comprises instructions for executing a service.

3. The system of claim 1, wherein the processor is further configured to provide a list of executing services based at least in part on the subset of configuration files that have been verified.

4. The system of claim 1, wherein the processor is further configured to provide display information to a user using a user system.

5. The system of claim 1, wherein the processor is further configured to determine baseline process information and anomaly information.

6. The system of claim 1, wherein the processor is configured to determine an index of the catalog of software installed packages in response to an indication that the catalog of software installed packages has changed.

7. A method for discovering services, comprising:
scanning, using a processor, a file system to identify configuration files associated with one or more packages found in a catalog of software installed packages;
identifying references to a configuration file in active processor memory;
placing the configuration file in a subset of configuration files associated with executing processes; and
verifying that a network port associated with an executing process corresponds to a designated network port as indicated in the configuration file associated with the executing process;
in response to determining that the configuration file indicates that the designated network port is for outbound traffic, verifying that the designated network port connection exists; and providing an indication of outbound traffic verification to a master discovery node of a cluster system network connection.

8. The method of claim 7, wherein a package found in the catalog of software installed packages comprises instructions for executing a service.

9. The method of claim 7, wherein the processor is further configured to provide a list of executing services based at least in part on the subset of configuration files that have been verified.

10. The method of claim 7, wherein the processor is further configured to provide display information to a user using a user system.

11. The method of claim 7, wherein the processor is further configured to determine baseline process information and anomaly information.

12. The method of claim 7, wherein the processor is configured to determine an index of the catalog of software installed packages in response to an indication that the catalog of software installed packages has changed.

13. The method of claim 7, wherein the processor is configured to determine a configuration file associated with each package of the catalog of software installed packages.

14. A method for discovering services, comprising:
scanning, using a processor, a file system to identify configuration files associated with one or more packages found in a catalog of software installed packages;
identifying references to a configuration file in active processor memory;
placing the configuration file in a subset of configuration files associated with executing processes;
verifying that a network port associated with an executing process of the executing processes corresponds to a designated network port as indicated in a configuration file in the subset of configuration files, wherein the configuration file is associated with the executing process;
in response to determining that the configuration file indicates that the designated network port is for inbound traffic, verifying that the network port is in a listening state; and
providing a list of executing services, based at least in part on the one or more configuration files that have been verified, to a master discovery node of a cluster system.

15. The method of claim 14, wherein a package found in the catalog of software installed packages comprises instructions for executing a service.

16. The method of claim 14, wherein the processor is further configured to provide a list of executing services based at least in part on the subset of configuration files that have been verified.

17. The method of claim 14, wherein the processor is further configured to provide display information to a user using a user system.

18. The method of claim 14, wherein the processor is further configured to determine baseline process information and anomaly information.

19. The method of claim 14, wherein the processor is configured to determine an index of the catalog of software installed packages in response to an indication that the catalog of software installed packages has changed.

20. The method of claim 14, wherein the processor is configured to determine a configuration file associated with each package of the catalog of software installed packages.

* * * * *

UNITED STATES PATENT AND TRADEMARK OFFICE
CERTIFICATE OF CORRECTION

PATENT NO. : 11,064,036 B2
APPLICATION NO. : 16/850998
DATED : July 13, 2021
INVENTOR(S) : Guido Patanella Page 1 of 1

It is certified that error appears in the above-identified patent and that said Letters Patent is hereby corrected as shown below:

In the Specification

In Column 9, Line(s) 40, delete "of" and insert --to--, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*